United States Patent
Mayama et al.

(10) Patent No.: US 7,075,356 B2
(45) Date of Patent: Jul. 11, 2006

(54) CHARGE PUMP CIRCUIT

(75) Inventors: Shuji Mayama, Mie (JP); Isao Isshiki, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 23 days.

(21) Appl. No.: 10/777,157

(22) Filed: Feb. 13, 2004

(65) Prior Publication Data

US 2004/0227564 A1 Nov. 18, 2004

(30) Foreign Application Priority Data

Feb. 14, 2003 (JP) ............................. 2003-037220
Feb. 14, 2003 (JP) ............................. 2003-037247

(51) Int. Cl.
*G05F 3/20* (2006.01)
*H03K 17/16* (2006.01)

(52) U.S. Cl. ..................... 327/536; 327/112; 363/60

(58) Field of Classification Search ................ 327/112, 327/536, 537; 363/59, 60; 326/83, 88, 89, 326/92
See application file for complete search history.

(56) References Cited

U.S. PATENT DOCUMENTS

| | | | | |
|---|---|---|---|---|
| 4,791,326 A | * | 12/1988 | Vajdic et al. | ............... 327/391 |
| 5,319,252 A | * | 6/1994 | Pierce et al. | ............... 327/170 |
| 5,550,501 A | * | 8/1996 | Ito et al. | ............... 327/374 |
| 5,672,992 A | * | 9/1997 | Nadd | ............... 327/390 |
| 6,114,900 A | * | 9/2000 | Yamaguchi | ............... 327/541 |
| 6,154,069 A | * | 11/2000 | Ebihara | ............... 327/112 |

* cited by examiner

*Primary Examiner*—Timothy P. Callahan
*Assistant Examiner*—Terry L. Englund
(74) *Attorney, Agent, or Firm*—Oliff & Berridge, PLC

(57) ABSTRACT

According to the charge pump circuit, a constant current charging and discharging circuit using follower circuits is interposed at current paths in charging and discharging a capacitor for stepping up. Transistors of the follower circuits are alternately made ON in accordance with a clock signal inputted from a signal input portion for switching to connect the capacitor for stepping up and restricting a current in cooperation with resistors or the like.

4 Claims, 4 Drawing Sheets

CHARGE PUMP CIRCUIT

BACKGROUND OF THE INVENTION

1. Field of the Invention

The present invention relates to a charge pump circuit, for example, a charge pump circuit for vehicle mounting.

2. Background Art

FIG. 4 is a circuit diagram of a charge pump circuit of a related art. As shown by FIG. 4, the charge pump circuit is constituted by including first and second diodes 101, 103, first and second capacitors 105, 107, first and second switches 109, 111, and a resistor 113 for stepping up a power source voltage (current) inputted from an input portion 115 to output from an output portion 117 by alternately periodically conducting the first and the second switches 109, 111.

When the first switch 109 is conducted, current from the input portion 115 flows along a path P1 and when the second switch 111 is conducted, current charged to the capacitor 105 is discharged and current from the input portion 115 flows along a path P2 and current stepped up thereby is provided to the output portion 117.

SUMMARY OF THE INVENTION

However, according to the charge pump circuit of the related art shown in FIG. 4, in accordance with switching to cut and conduct the first and second switches 109, 111, as shown by FIG. 5, current flowing in the capacitor 105 (particularly, magnitude of current) is rapidly changed. Particularly, at instances of conducting the respective switches 109, 111, a current flowing in the capacitor 105 is increased and reduced in a very short period of time and therefore, considerable noise is generated at a power source line, thereby, in the case of the charge pump circuit for vehicle mounting, a hazard of other vehicle-mounted apparatus of radio or the like may be brought about.

Here, a time period Ta on FIG. 5 corresponds to a time period of conducting the first switch 109 and a time period Tb corresponds to a time period of conducting the second switch 111.

Further, although as a countermeasure for preventing such a noise, there is also conceivable unit such as a filter for inserting on the current path, by adding the filter, there is a drawback of bringing about an increase in cost or an increase in a dimension and a weight thereof.

Hence, it is an object of the invention to provide a charge pump circuit for achieving a reduction in noise and restraining the cost, the dimension and the weight.

According to an aspect of the invention, a charge pump circuit includes first and second diodes interposed in series between an input portion for receiving a power source input to an object to be stepped up and an output portion for outputting a stepped up voltage such that a forward direction of each diode is directed to a side of the output portion, a capacitor interposed on a connecting path between a connecting portion of the first diode on a side of the output portion and a ground, the first diode being disposed on a side of the input portion with respect to the second diode, the capacitor having two connecting portions, a first switch for conducting and cutting a connecting path between one of the connecting portions of the capacitor and the ground, a second switch for conducting and cutting a connecting path between the one connecting portion of the capacitor and the input portion, and a driver for conducting the first switch and the second switch alternately in phases opposite to each other. Preferably, a constant current charging and discharging circuit using a follower circuit is interposed at any position on a first path, through which a current flows when a connecting path between the one connecting portion of the capacitor and the ground is conducted by the first switch and a current from the input portion charges the capacitor, and any position on a second path, through which a current flows when the connecting path between the one connecting portion of the capacitor and the input portion is conducted by the second switch and the capacitor is discharged, and the follower circuit includes a transistor interposed at any position on the first path and the second path for controlling an amount of a flowing current flowing through the paths, and a resistor connected in series to the transistor on an upstream side or a downstream side in a current flowing direction of the transistor.

According to another aspect of the invention, a charge pump circuit includes first and second diodes interposed in series between an input portion for receiving a power source input to an object to be stepped up and an output portion for outputting a stepped up voltage such that a forward direction of each diode is directed to a side of the output portion, a capacitor interposed on a connecting path between a connecting portion of the first diode on a side of the output portion and a ground, the first diode being disposed on a side of the input portion with respect to the second diode, the capacitor having two connecting portions, a first switch for conducting and cutting a connecting path between one of the connecting portions of the capacitor and the ground, a second switch for conducting and cutting a connecting path between the one connecting portion of the capacitor and the input portion, and a driver for conducting the first switch and the second switch alternately in phases opposite to each other. Preferably, a constant current charging and discharging circuit using a current mirror circuit is provided at any position on a first path, through which a current flows when a connecting path between the one connecting portion of the capacitor and the ground is conducted by the first switch and a current from the input portion charges the capacitor, and any position on a second path, through which a current flows when the connecting path between the one connecting portion of the capacitor and the input portion is conducted by the second switch and the capacitor is discharged.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
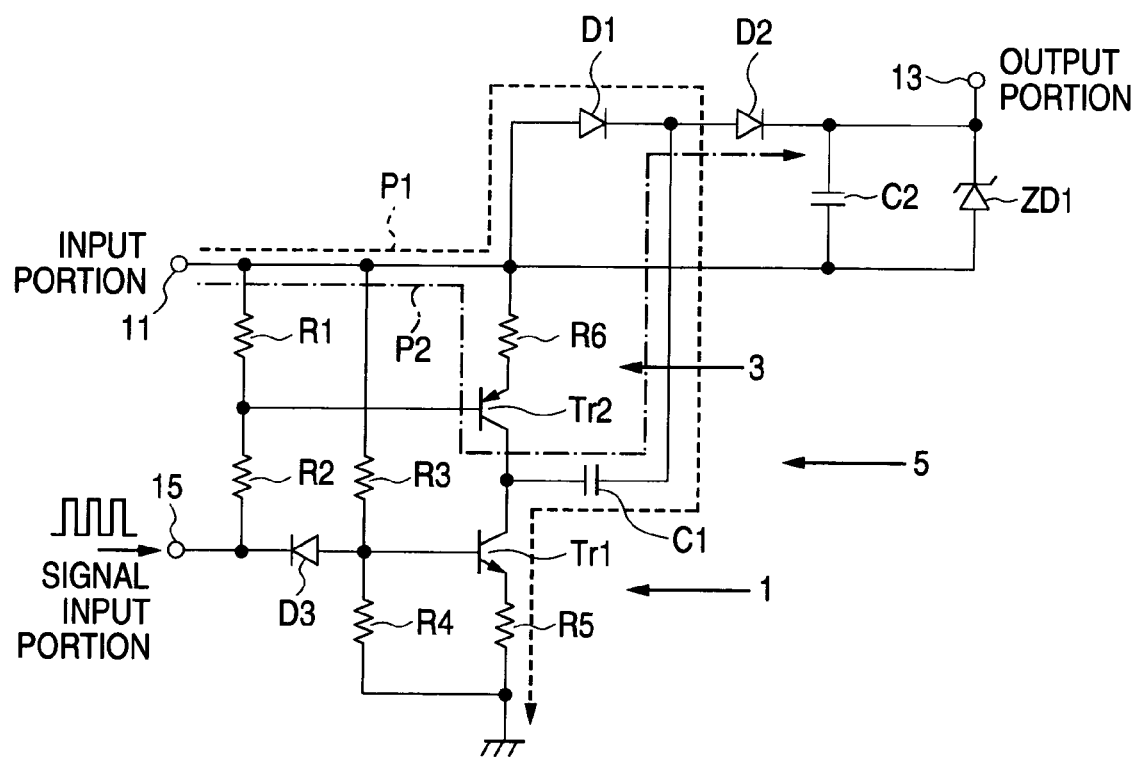
FIG. 1 is a circuit diagram of a charge pump circuit according to a first embodiment of the invention.

FIG. 1 is a circuit diagram of a charge pump circuit according to a first embodiment of the invention. As shown by FIG. 1, the charge pump circuit is constituted by including a first through a third diode D1 through D3, first and second capacitors C1, C2, first and second transistors Tr1, Tr2, first through sixth resistors R1 through R6, a Zener diode ZD1, and a driving circuit (driver), not illustrated, for driving the transistors Tr1, Tr2. Among them, the capacitor C1 corresponds to a stepping up capacitor according to the invention. Further, a combination of the transistor Tr1 and the resistor R5 and a combination of the transistor Tr2 and the resistor R6 respectively constitute follower circuits 1, 3 according to the invention and the follower circuits 1, 3, the resistors R1 through R3 and the diode D3 constitute a constant current charging and discharging circuit 5. Further, the transistors Tr1, Tr2 serve also as first and second switches according to the invention. Further, a bipolar type NPN transistor is used for the transistor Tr1 and a bipolar type PNP transistor is used for the transistor Tr2.

Further, the charge pump circuit according to the first embodiment is for vehicle mounting and used for driving a gate of an FET for controlling a power source for controlling a current flowing state of a power source current supplied from a power source line to a load. In this case, the FET for controlling the power source is provided on an upstream side (high side) in a current flowing direction of the load and a power source line of the charge pump circuit and the power source lines of the respective loads are made common for simplifying the constitution.

The first and the second diodes D1, D2 are interposed in series between an input portion 11 for receiving a power source input of an object for stepping up and an output portion 13 for outputting stepped-up voltage such that a forward direction is constituted toward a side of the output portion 13 and the first diode D1 is disposed on a side of the input portion 11.

The capacitor C1 is interposed on a connecting path between a connecting portion of the diode D1 on the side of the output portion 13 and the ground. The capacitor C2 is interposed between a connecting portion of the diode D2 on the side of the output portion 13 and the input portion 11. The Zener diode ZD1 is connected in parallel with the capacitor C2 such that a forward direction is constituted toward the side of the output portion 13. Further, the capacitor C2 and the Zener diode ZD1 are ommittable depending on use or the like of the charge pump circuit.

The transistor Tr1 and the resistor R5 are interposed in series on the connecting path between a connecting portion on one side of two connecting portions of the capacitor C1 and the ground such that the transistor Tr1 is disposed on the side of the capacitor C1. That is a collector of the transistor Tr1 is connected to the connecting portion on the side of the capacitor C1 and an emitter of the transistor Tr1 is connected to the ground via the resistor R5. A base of the transistor Tr1 is connected to a signal input portion 15 toward a side of the signal input portion 15 via the diode D3 in the forward direction, connected to the input portion 11 via the resistor R3 and connected to the ground via the resistor R4.

The transistor Tr2 and the resistor R6 are interposed in series between the connecting portion on the side of the capacitor C1 and the input portion 11 such that the transistor Tr2 is disposed on the side of the capacitor C1. That is, a collector of the transistor Tr2 is connected to the connecting portion on the side of the capacitor C1 and an emitter of the transistor Tr2 is connected to the input portion 11 via the resistor R6. A base of the transistor Tr2 is connected to the input portion 11 via the resistor R1 and connected to the signal input portion 15 via the resistor R2.

Next, an explanation will be given of function and operation of respective portions of the charge pump circuit according to the first embodiment of the invention.

The signal input portion 15 is inputted with a control signal (clock signal). The clock signal is a signal for making the transistors Tr1, Tr2 ON, OFF periodically and alternately for switching a state of connecting the capacitor C1 to the ground or the input portion 11 and is periodically switched to high, low.

As basic operation of the charge pump circuit, in accordance with the clock signal inputted from the signal input portion 15, the transistors Tr1, Tr2 are made ON periodically alternately, thereby, the state of connecting the capacitor C1 to the ground or the input portion 11 is switched alternately regularly and inversely.

Here, respective resistance values or the like of the resistors R3, R4, R5 are set to values such that in accordance with switching the clock signal inputted to the signal input portion 15 to high, low, a main path of current flowing from the input portion 11 via the resistor R3 is alternately switched to a path of flowing to the ground via the base, the emitter of the transistor Tr1 and the resistor R5 and a path for flowing to the signal input portion 15 via the diode D3.

By setting in this way, when the clock signal is at a high level, in accordance with changing a potential of the signal input portion 15 to the high level, a path of current flowing from the input portion 11 to the signal input portion 15 via the resistor R3 and the diode D3 is cut, thereby, a current flows between the base and the emitter of the transistor Tr1 from the input portion 11 via the resistor R3 to thereby make the transistor Tr1 ON. Further, on the contrary, when the clock signal is at a low level, in accordance with changing the potential of the signal input portion 15 to the low level, the path of current flowing from the input portion 11 to the signal input portion 15 via the resistor R3 and the diode D3 is opened, thereby, the current flowing from the input portion 11 to the base of the transistor Tr1 via the resistor R3 is cut and the transistor Tr1 is made OFF.

Further, respective resistance values or the like of the resistors R1, R2, R6 are set to values such that in accordance with switching the clock signal inputted to the signal input portion 15 to high, low, presence or absence of current flowing to the signal input portion 15 via the resistor R6, the emitter and the base of the transistor Tr2 and the resistor R2 is switched.

By setting in this way, when the clock signal is at the high level, in accordance with changing the potential of the signal input portion 15 to the high level, a flow of current flowing from the input portion 11 to the signal input portion 15 via the resistor R6, the emitter and the base of the transistor Tr2 and the resistor R2 is cut and the transistor Tr2 is made OFF. Further, on the contrary, when the clock signal is at the low level, in accordance with changing the potential of the signal input portion 15 to the low level, there is produced a flow of current flowing from the input portion 11 to the signal input portion 15 via the resistor R6, the emitter and the base of the transistor Tr2 and the resistor R2 and the transistor Tr2 is made ON.

Therefore, when the clock signal is at the high level, whereas the transistor Tr1 is made ON and the connecting portion on the side of the capacitor C1 is conducted to the ground via the transistor Tr1 and the resistor R5, the transistor Tr2 is made OFF, an interval between the connecting portion on the side of the capacitor C1 and the input portion 11 is cut, in accordance therewith, current from the input portion 11 flows from a path P1 to thereby charge the capacitor C1. On the other hand, when the inputted clock signal is at the low level, whereas the transistor Tr1 is made OFF and an interval between the connecting portion on the side of the capacitor C1 and the ground is cut, the transistor Tr2 is made ON, the interval between the connecting portion on the side of the capacitor C1 and the input portion 11 is conducted via the transistor Tr2 and the resistor R6, in accordance therewith, current charged to the capacitor C1 is discharged and current from the input portion 11 flows along a path P2 to thereby provide stepped-up current to the output portion 13.

An explanation will be given of current restricting operation by the constant current charging and discharging circuit 5. At the follower circuits 1, 3, the transistors Tr1, Tr2 make an amount of flowing current in accordance with the base current flow. Therefore, in the case in which current flowing in the path P1 is increased when the transistor Tr1 is made ON, in accordance with an amount of current flowing at the resistor R5, emitter potential of the transistor Tr1 is elevated relative to base voltage, in accordance therewith, the base current is restrained, as a result, also flowing current of the transistor Tr1 is restrained to thereby restrict current flowing at the path P1. Further, in the case in which current flowing at the path P1 is reduced when the transistor Tr1 is made ON, in accordance with a reduction in the amount of current flowing at the resistor R5, the emitter potential of the transistor Tr1 is lowered relative to the base voltage, in accordance therewith, the base current is increased, as a result, also the flowing current of the transistor Tr1 is increased to thereby stabilize current flowing at the path P1.

Meanwhile, in the case in which current flowing at the path P2 is increased when the transistor Tr2 is made ON, in accordance with an amount of current flowing at the resistor R6, emitter potential of the transistor Tr2 is lowered relative to base voltage, in accordance therewith, base current is restrained, as a result, also flowing current of the transistor Tr2 is restrained to thereby restrict current flowing at the path P2. In the case in which current flowing at the path P2 is reduced when the transistor Tr2 is made ON, in accordance with a reduction in an amount of current flowing at the resistor R6, the emitter potential of the transistor Tr2 is elevated relative to the base voltage, in accordance therewith, base current is increased, as a result, also the flowing current of the transistor Tr2 is increased to thereby stabilize current flowing at the path P2.

Figure 2:
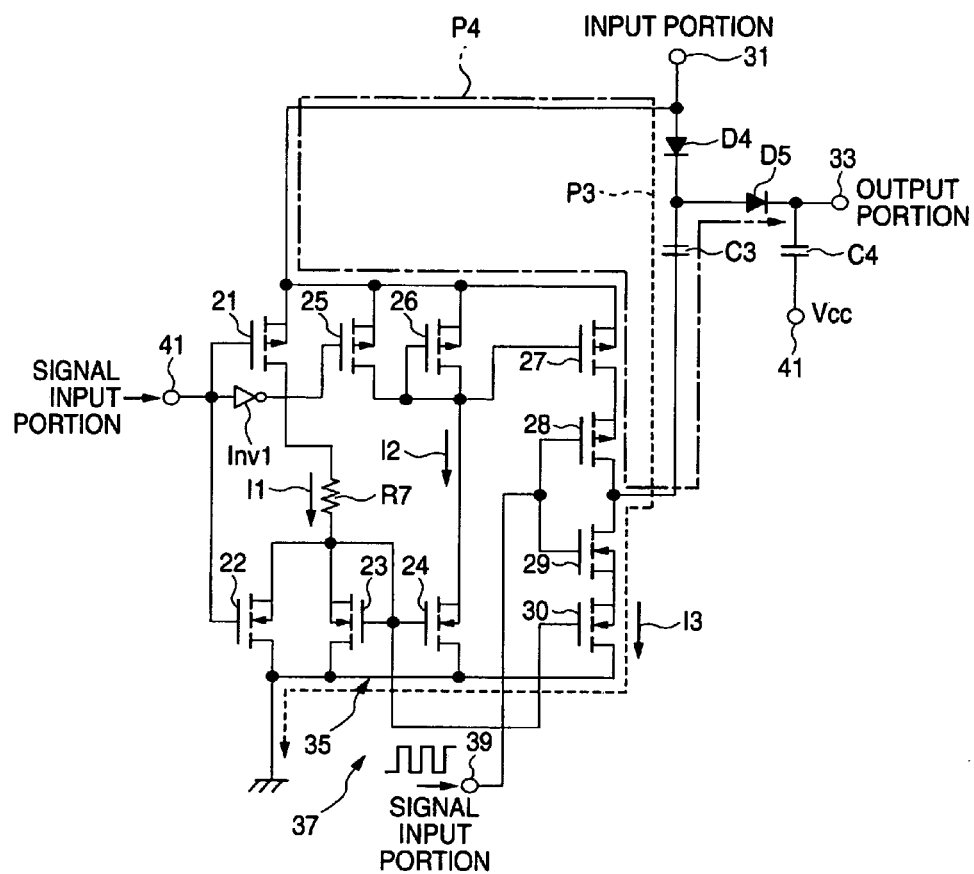
FIG. 2 is a circuit diagram of a charge pump circuit according to a second embodiment of the invention.

FIG. 2 is a circuit diagram of a charge pump circuit according to a second embodiment of the invention. As shown by FIG. 2, the charge pump circuit is constituted by including first and second diodes D4, D5, first and second capacitors C3, C4, first thought tenth FETs 21 through 30, a resistor R7, an inverter Inv1, and a driving circuit (driver), not illustrated, for driving FETs 28, 29. Among them, the capacitor C3 corresponds to a capacitor for stepping up according to the invention, FET 29 corresponds to a first switch according to the invention, and FET 28 corresponds to a second switch according to the invention. Further, FETs 23, 24, 30 constitute a current mirror circuit (MOSFET Weidler current mirror circuit) 35, and FETs 23, 24, 27 including FETs 23, 24, 30 constitute a constant current charging and discharging circuit 37. Here, FETs 21, 25 through 28 are P-channel MOSFETs and FETs 22 through 24, 29, 30 are N-channel MOSFETs.

Further, the charge pump circuit according to the second embodiment is for vehicle mounting and is used for driving a gate of an FET for controlling a power source for controlling a flowing state of a power source current supplied from a power source line to a load. In this case, the FET for controlling the power source is provided on an upstream side (high side) in a current flowing direction of the load and the power source line of the charge pump circuit and power source line of respective loads are made common for simplifying the constitution.

Here, the current mirror circuit 35 according to the second embodiment is constituted to connect two output side FETs 24, 30 in two series with the input side FET 23 and two of output currents (mirror currents) I2, I3 correspond to an input current I1.

The first and the second diodes D4, D5 are interposed in series between an input portion 31 for receiving a power source input of an object to be stepped up and an output portion 33 for outputting stepped up voltage such that a forward direction is constituted toward a side of the output portion 33 and the first diode D4 is disposed on a side of the input portion 31.

The capacitor C3 is interposed on a connecting path between a connecting portion of the diode D4 on a side of the output portion and the ground. The capacitor C4 is interposed between a connecting portion of the diode D5 on a side of an output portion and a power source voltage input portion 41. Further, the capacitor C4 is omittable depending on use or the like of the charge pump circuit.

FETs 29, 30 are interposed in series on the connecting path between a connecting portion on one side of two connecting portions of the capacitor C3 and the ground such that FET 29 is disposed on a side of the capacitor C3. That is, a drain of FET 29 is connected to the connecting portion on the side of the capacitor C3, a drain of FET 30 is connected to a source of FET 29, and a source of FET 30 is connected to the ground. A gate of FET 29 is commonly connected to a gate of FET 28, mentioned later, and connected to a signal input portion 39 for receiving an input of a control signal. A gate of FET 30 is connected to gates of FETs 23, 24, mentioned later, and a drain of FET 22.

FETs 27, 28 are interposed in series between the input portion 31 and the connecting portion on the side of the capacitor C3 such that FET 27 is disposed on a side of the input portion 31. That is, a source of FET 27 is connected to the input portion 31, a source of FET 28 is connected to a drain of FET 27, and a drain of FET 28 is connected to the connecting portion on the side of the capacitor C3. A gate of FET 27 is connected to drains of FETs 24, 25, 26, mentioned later. A gate of FET 25 is connected to a signal input portion 41 via the inverter Inv1.

Next, an explanation will be given of function and operation of respective portions of the charge pump circuit according to the second embodiment.

The signal input portion 39 is inputted with the control signal (clock signal). The clock signal is a signal for periodically and alternately making FETs 28, 29 ON, OFF for switching a state of connecting the capacitor C3 and the ground or the input portion 31 and is switched to high, low periodically.

The signal input portion 41 is for inputting a control signal (ON/OFF signal) for making the constant current charging and discharging circuit including the mirror circuit 35 ON, OFF. The ON/OFF signal is inputted with a high or a low signal, when the signal is low, the constant current charging and discharging circuit 37 is made ON and when the signal is high, the constant current charging and discharging circuit 37 is made OFF.

In accordance with the clock signal inputted from the signal input portion 39, FETs 28, 29 are periodically alternately made ON, thereby, the state of connecting the capacitor C3 to the ground or the input portion 31 is switched alternately, regularly and inversely. That is, whereas when the inputted clock signal is at a high level, FET 29 is made ON and the connecting portion on the side of the capacitor C3 is conducted to the ground via FETs 29, 30 (a case in which FET 30 is a made ON), FET 28 is made OFF, an interval between the connecting portion on the side of the capacitor C3 and the input portion 31 is cut, in accordance therewith, current from the input portion 31 flows along a path P3 to thereby charge the capacitor C3. On the other hand, whereas when the inputted clock signal is at a low level, FET 29 is made OFF and the interval between the connecting portion on the side of the capacitor C3 and the ground is cut, FET 28 is made ON and the interval between the connecting portion on the side of capacitor C3 and the input portion 31 is conducted via FETs 28, 27 (a case in which FET 27 is made ON), in accordance therewith, current charged to the capacitor C3 is discharged and current from the input portion 31 flows along a path P4 to thereby provide current stepped up thereby to the output portion 33.

Further, when current flows in the respective paths P3, P4, an amount of flowing current flowing through FETs 27, 30 interposed at the paths P3, P4 is stabilized by the current mirror circuit 35 and FET 27 operated in cooperation therewith (particularly, a steep increase in the amount of flowing current is restrained).

When the ON/OFF signal inputted from the signal input portion 41 is at a low level, FET 21 is made ON, in accordance therewith, power source voltage of the input portion 31 is applied to the gates of FETs 23, 24, 30 via FET 21 and the resistor R7 to thereby make FETs 23, 24, 30 ON, in accordance therewith, FET 26 is made ON, thereby, the input current I1 and the output current I2 flow in the current mirror circuit 35 and the output current I3 is brought into a flowable state. Further, at this occasion, FET 27 is made ON by conducting the gate to the ground via FET 24. FET 22 is made OFF by inputting the signal at low level to the gate. FET 25 is made OFF by inputting the signal at a high level to the gate via the inverter Inv1.

Further, in a state in which the current mirror circuit 35 is made ON in this way, FET 30 is going to make current of an amount of the output current I3 in accordance with a mirror ratio relative to the input current I1 flow and therefore, even when current flowing at FET 30 is assumedly flowing to increase instantaneously, a change to increase the current is restrained by FET 30. Thereby, current flowing along the path P3 (current in charging the capacitor C3) is stabilized by operation of FET 30.

Further, FET 24 is going to make current of an amount of the output current I2 in accordance with a mirror ratio relative to the input current I1 flow and therefore, the output current I3 is stabilized in accordance with stability of the input current I1, thereby, also voltage between the gate and the source of FET 27 is also stabilized. Therefore, FET 27 is going to make constant current flow in accordance with the stability of the voltage between the gate and the source and therefore, even when current flowing at FET 27 is assumedly going to increase instantaneously, a change to increase the current is restrained by FET 27. Thereby, current flowing along the path P4 (current in discharging the capacitor C3) is stabilized by operation of FET 27.

When the ON/OFF signal is switched from the low level to the high level, FET 21 is made OFF by inputting the signal at the high level to the gate, the gates of FETs 23, 24, 30 are released from being applied with voltage, FET 22 is made ON by inputting the signal at the high level to the gate, and voltages between the drains and the sources of FETs 23, 24 are nullified to thereby make FETs 23, 24, 30 OFF. Further, FET 25 is made ON by inputting the signal at the low level to the gate via the inverter Inv1, voltages between the gates and the sources of FETs 26, 27 are nullified to thereby make FETs 26, 27 OFF.

Figure 3:
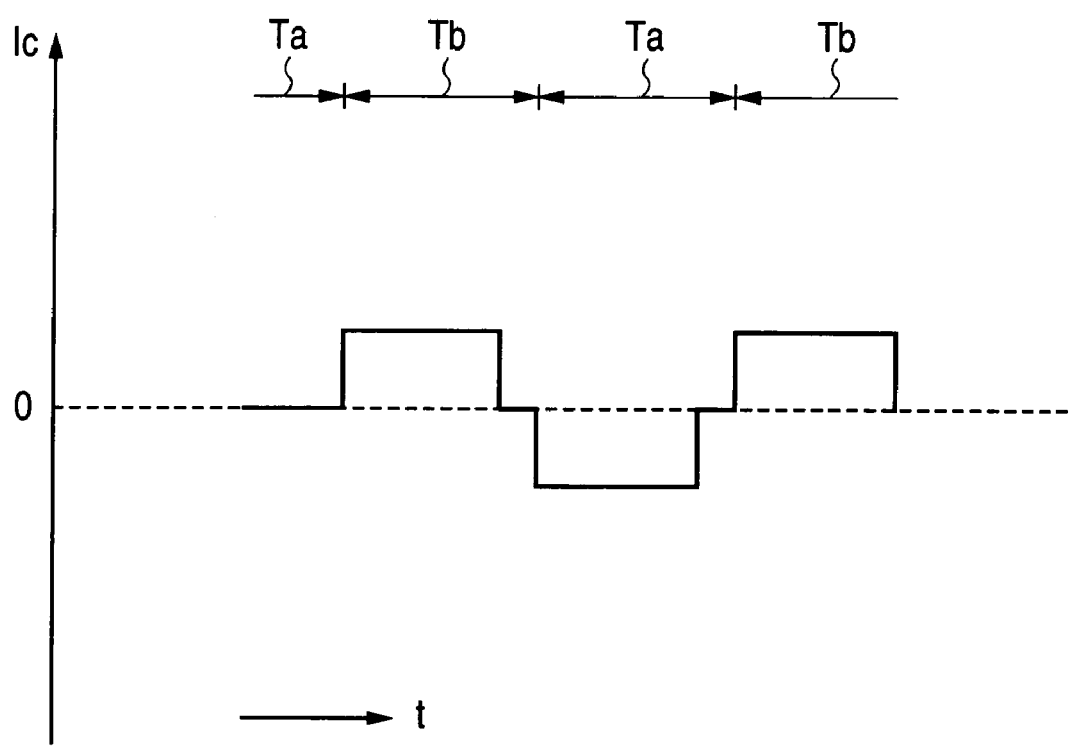
FIG. 3 is a diagram showing a situation of changing current flowing at a capacitor for stepping up.
Figure 4:
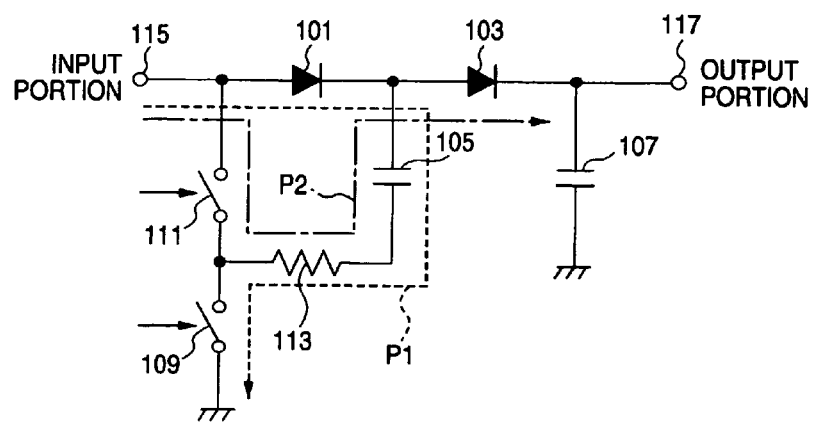
FIG. 4 is a circuit diagram of a charge pump circuit of a related art.
Figure 5:
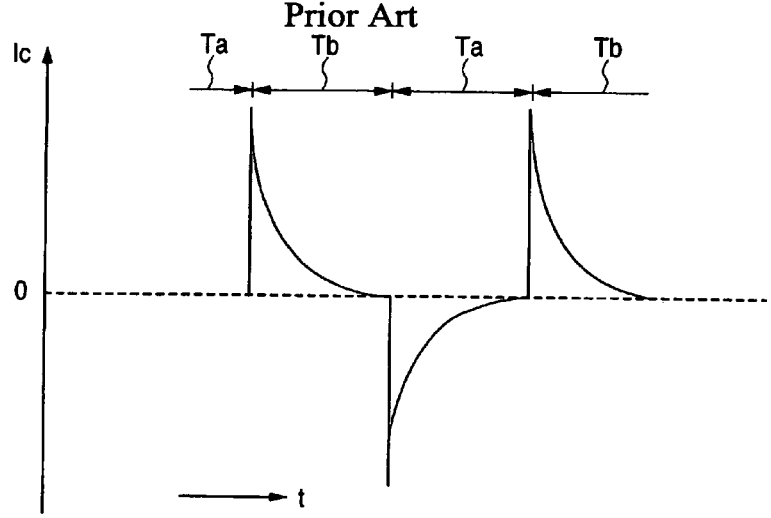
FIG. 5 is a diagram showing a situation of changing current flowing at a capacitor for stepping up.

FIG. 3 is a diagram showing a situation of changing current flowing at the capacitor C1 for stepping up in the first embodiment of the invention and at the capacitor C3 in the second embodiment for stepping up. In the first embodiment, it is known that current is restricted by the constant current charging and discharging circuit 5 and the steep change of current is restrained. Furthermore, it is known that current is restricted and a steep change in current is restrained by the constant current charging and discharging circuit 37 in the second embodiment. Here, time periods Ta, Tb on FIG. 3 correspond to the time intervals Ta, Tb of FIG. 5, mentioned above.

As described above, according to the first embodiment, there is constructed a constitution in which the constant current charging and discharging circuit 5 using the follower circuits 1, 3 is interposed at the current paths P1, P2 in charging and discharging the capacitor C1 for stepping up and therefore, noise can be reduced while restraining the cost, the dimension and the weight.

Further, since the transistors Tr1, Tr2 of the follower circuits 1, 3 provided to the constant current charging and discharging circuit 5 function also as a switch for switching to connect the capacitor C1 for stepping up and therefore, the charge pump circuit can be constituted by a small number of parts.

As described above, according to the second embodiment, there is constructed a constitution in which the constant current charging and discharging circuit 37 using the current mirror circuit 35 is interposed in the current paths P3, P4 in charging and discharging the capacitor C3 for stepping up and therefore, noise can be reduced while restraining the cost, the dimension and the weight.

Further, since noise generated at the power source line can be restrained by operating the charge pump circuit, even when the power source lines of the charge pump circuit and other vehicle-mounted apparatus (load) of radio or the like are made common, an influence of the charge pump circuit effected on other vehicle-mounted apparatus can be restrained.

Further, although the embodiment is constituted by using the bipolar type transistors for the transistors constituting the follower circuits 1, 3, the follower circuits 1, 3 having similar function can also be constituted by using N-channel or P-channel MOSFETs.

According to the first aspect of the invention, there is constructed a constitution in which the constant current charging and discharging circuit using the follower circuits constituted by including the transistors and the resistors is interposed at the current paths in charging and discharging the capacitor for stepping up and therefore, noise can be reduced while restraining the cost, the dimension and the weight.

According to the second aspect of the invention, the transistors of the follower circuits provided at the constant current charging and discharging circuit function also as the first and the second switches for switching to connect the capacitor for stepping up and therefore, the charge pump circuit can be constituted by a small number of parts.

According to the third aspect of the invention, the following advantage is achieved. That is, in the constitution according to the invention, it is general that the FET is provided on the upstream side in the current flowing direction of the load and the power source line of the charge pump circuit and the power source lines of the respective loads are made common, according to the charge pump circuit of the invention, noise generated at the power source line can be restrained by operating the charge pump circuit and therefore, an influence of the noise effected on other vehicle-mounted apparatus (load) of radio or the like can be restrained.

According to the fourth aspect of the-invention, there is constructed a constitution in which the constant current charging and discharging circuit using the current mirror circuit is interposed at the current paths in charging and discharging the capacitor for stepping up and therefore, noise can be reduced while restraining the cost, the dimension and the weight.

What is claimed is:

1. A charge pump circuit, comprising:
    first and second diodes interposed in series between an input portion for receiving a power source input to an object to be stepped up and an output portion for outputting a stepped up voltage such that a forward direction of each diode is directed to a side of the output portion;
    a capacitor interposed on a connecting path between a connecting portion of the first diode on a side of the output portion and a ground, the first diode being disposed on a side of the input portion with respect to the second diode, the capacitor having two connecting portions;
    a first switch for conducting and cutting a connecting path between one of the connecting portions of the capacitor and the ground;
    a second switch for conducting and cutting a connecting path between the one connecting portion of the capacitor and the input portion; and
    a driver for conducting the first switch and the second switch alternately in phases opposite to each other;
    wherein:
    a constant current charging and discharging circuit, using a first follower circuit and a second follower circuit, is arranged to be along a first path, through which a current flows when a connecting path between the one connecting portion of the capacitor and the ground is conducted by the first switch and a current from the input portion charges the capacitor, and along a second path, through which a current flows when the connecting path between the one connecting portion of the capacitor and the input portion is conducted by the second switch and the capacitor is discharged;
    the first follower circuit comprises:
        a first transistor interposed at any position on the first path for controlling an amount of a flowing current flowing through the first path and functioning as the first switch; and
        a first resistor connected in series to the first transistor on a downstream side in a current flowing direction of the first transistor;
    the second follower circuit comprises:
        a second transistor interposed at any position on the second path for controlling an amount of a flowing current flowing through the second path and functioning as the second switch; and
        a second resistor connected in series to the second transistor on an upstream side in a current flowing direction of the second transistor, wherein one end of the second resistor is connected to the first diode and another end of the second resistor is connected to the second transistor;
    a third resistor;
    a fourth resistor; and
    a third diode, wherein the third resistor, the fourth resistor, and the third diode are directly connected to each other by a first connecting point, and the first connecting point is directly connected to a base of the first transistor.

2. The charge pump circuit according to claim 1, wherein the charge pump circuit is for vehicle mounting and is used for driving a gate of an FET for controlling a power source for controlling a flowing state of a power source current supplied from a power source line to a load.

3. The charge pump circuit according to claim 1, further comprising:
    a fifth resistor; and
    a sixth resistor, wherein a second connecting point exists between the fifth resistor and the sixth resistor, and the second connecting point is directly connected to a base of the second transistor.

4. The charge pump circuit according to claim 1, wherein the first resistor is connected on one end to the first transistor and is connected on another end to ground.

* * * * *